(12) United States Patent
Bohlen et al.

(10) Patent No.: US 6,811,185 B2
(45) Date of Patent: Nov. 2, 2004

(54) STEERING COLUMN FOR A MOTOR VEHICLE

(75) Inventors: Jens Bohlen, Reppenstedt (DE); Christian Born, Hamburg (DE); Wolfgang Schuliers, Buchholz (DE)

(73) Assignee: DaimlerChrysler AG, Stuttgart (DE)

( * ) Notice: Subject to any disclaimer, the term of this patent is extended or adjusted under 35 U.S.C. 154(b) by 44 days.

(21) Appl. No.: 09/930,480

(22) Filed: Aug. 16, 2001

(65) Prior Publication Data

US 2002/0030356 A1 Mar. 14, 2002

(30) Foreign Application Priority Data

Aug. 16, 2000 (DE) .......................................... 100 39 792

(51) Int. Cl.[7] .............................. B62D 1/11; F16F 7/12
(52) U.S. Cl. ...................................... 280/777; 188/374
(58) Field of Search ........................... 280/777; 74/492, 74/493; 188/371, 372–373, 374

(56) References Cited

U.S. PATENT DOCUMENTS

| | | | | |
|---|---|---|---|---|
| 3,504,567 A | * | 4/1970 | Ohashi et al. ................. | 74/492 |
| 3,703,106 A | | 11/1972 | Arnston et al. ................ | 74/492 |
| 4,838,576 A | * | 6/1989 | Hamasaki et al. ........... | 280/777 |
| 4,901,592 A | * | 2/1990 | Ito et al. ........................ | 74/492 |
| 5,503,431 A | * | 4/1996 | Yamamoto .................... | 280/777 |
| 5,517,877 A | | 5/1996 | Hancock ........................ | 74/492 |
| 5,547,221 A | * | 8/1996 | Tomaru et al. .............. | 280/777 |
| 5,562,307 A | * | 10/1996 | Connor ........................ | 280/777 |
| 5,605,352 A | * | 2/1997 | Riefe et al. ................... | 280/777 |
| 5,609,364 A | * | 3/1997 | Fouquet et al. .............. | 280/777 |
| 5,615,916 A | * | 4/1997 | Fujiu et al. ................... | 280/777 |
| 5,706,704 A | | 1/1998 | Riefe et al. .................... | 74/493 |
| 5,775,172 A | | 7/1998 | Fevre et al. ................... | 74/492 |
| 5,788,278 A | | 8/1998 | Thomas et al. .............. | 280/777 |
| 5,961,146 A | | 10/1999 | Matsumoto et al. ......... | 280/777 |
| 6,109,652 A | * | 8/2000 | Kim et al. .................... | 280/777 |
| 6,189,929 B1 | * | 2/2001 | Struble et al. ............... | 280/777 |
| 6,224,104 B1 | * | 5/2001 | Hibino ......................... | 280/777 |
| 6,322,103 B1 | * | 11/2001 | Li et al. ....................... | 280/777 |
| 6,349,610 B2 | * | 2/2002 | Glinowiecki et al. ......... | 74/492 |
| 6,394,241 B1 | * | 5/2002 | Desjardins et al. .......... | 188/376 |

FOREIGN PATENT DOCUMENTS

| | | | |
|---|---|---|---|
| DE | 1 962 183 | 6/1970 | |
| DE | 2637406 | 3/1977 | |
| DE | 19515009 A1 | 12/1995 | |
| DE | 19710725 A1 | 11/1997 | |
| DE | 19819713 A1 | 11/1999 | |
| JP | 63046972 A | * 2/1988 | ............ B62D/1/18 |
| JP | 1249572 | 10/1989 | |

OTHER PUBLICATIONS

Foreign Office Action with English Translation.
European Search Report.

* cited by examiner

*Primary Examiner*—Paul N. Dickson
*Assistant Examiner*—Laura B. Rosenberg
(74) *Attorney, Agent, or Firm*—Crowell & Moring LLP

(57) ABSTRACT

A steering column for a motor vehicle has a steering shaft rotatably mounted in a tubular jacket. The tubular jacket is secured on two rails extending substantially in an axial direction and fixed on the bodywork. The tubular jacket is guided between the rails in the event of an axial displacement in case of a crash. At least one rail is assigned at least one deformation element which is secured at least at one end on the rail and is plastically deformable, with absorption of energy, in the event of an axial displacement of the tubular jacket in a manner such that it is deformed by rolling friction via deflection structure fixedly disposed on the tubular jacket.

34 Claims, 6 Drawing Sheets

STEERING COLUMN FOR A MOTOR VEHICLE

BACKGROUND AND SUMMARY OF THE INVENTION

This application claims the priority of German application 100 39 792.1, filed Aug. 16, 2000, the disclosures of which is expressly incorporated by reference herein.

The present invention relates to a steering column for a motor vehicle.

In the event of an impact that follows a primary collision and in which a vehicle, for example, strikes another vehicle or another obstruction, the body of a vehicle driver may, without the protection of an airbag for example, strike a steering wheel, because the airbag had deployed after the primary collision and has now collapsed again.

In order to relieve or reduce the impact acting upon the body of the driver in a secondary collision and to prevent a substantial injury to the vehicle driver by the steering column, various driver protection devices are known from the prior art and are referred to as impact-absorbing steering devices.

Thus, German Patent Document DE 195 15 009 A1 proposes an impact-absorbing steering apparatus in which, by a reduction of a peak load in an initial movement of a secondary impact, impact energy caused by the secondary collision is absorbed by the flexion of a bending zone of an energy-absorbing panel. This energy-absorbing panel possesses a rear end which is retained by a vehicle body. A slot is formed in the bending region and a cross-sectional surface region is reduced so that the flexible region is easily capable of plastic deformation and can thus absorb energy.

By means of such an energy absorption panel, an increase in the peak load during the initial movement of the secondary impact is prevented despite the hardening of the bending region during the production process.

However, the type of energy absorption panels as described in that printed publication exhibit the disadvantage that they customarily require a great deal of structural space. Moreover, with such a configuration, the steering column is not guided in the event of an accident, and therefore the steering column can be displaced and deformed in an uncontrolled manner. This also can result in injury to the vehicle occupants.

German published Patent Application DE 196 21 183 discloses a telescopic column which is used for vehicles to reduce the risk of personal injury in the event of accidents. The telescopic column for vehicles described in this document, having a lower part that is disposed in an upper part in an axial telescopic manner and having a securing system for the steering column upper part, is characterized in that the securing system contains at least one component which can deform progressively in the event of an axial telescopic movement of the steering column upper part and energy absorption.

In such a telescopic column, however, the measures for energy absorption during compression of the steering column in the event of a collision have to be provided at the cost of a relatively high additional construction effort.

U.S. Pat. No. 5,961,146 discloses another energy absorbing steering column. In this case, the apparatus provided for the purpose has a first bracket, which is fixed to the steering column in a central region, and a second bracket, which is secured on the bodywork in order to support the first bracket. A connecting device that comprises an energy absorption member to assist the first bracket up to a predetermined force is additionally provided. As a result, a collision force that is applied to the steering column can be absorbed, and the first bracket is enabled to move relative to the second bracket, in order to absorb the impact energy if a particular load is applied to the steering column.

The energy-absorbing member includes a metallic wire which has a basic portion and elongated deformable portions extending respectively from the ends of said basic portion towards the free ends. Each of the deformable portions has folded-back portions and deformable portions extending from the folded-back portions towards end portions. The energy-absorbing member is retained at a basic portion of the first or the second bracket and engaged or engageable with the other bracket at its folded-back portion. When the force applied in a secondary collision exceeds a predetermined value and the first bracket moves forward relative to the second bracket, the metallic wire is pressed by the first bracket onto the folded-back portions against the bolt in order to press the folded-back portions along the deformable portions towards the free portions, thereby absorbing secondary collision energy.

In addition, German Patent Document DE 198 19 713 discloses a steering column for a motor vehicle having a steering column rotatably mounted in a tubular jacket, the tubular jacket being assigned at least one deformation element which is plastically deformable, with absorption of energy, in the event of an axial displacement of the tubular jacket. In this arrangement, the at least one deformation element is fixed to the tubular jacket on at least one side and lies on deflection means disposed fixedly on the bodywork and axially positioned, relative to the deformation element, in a manner such that the deformation element is deformed with the aid of the deflection means in the event of an axial displacement of the tubular jacket.

In these two previously described steering columns, however, it has proved to be a disadvantage that the design of the arrangements for energy absorption requires a very substantial construction effort.

A further energy-absorbing steering column for motor vehicles is disclosed in German Published Patent Application DE 197 10 725 (corresponding U.S. Pat. No. 5,706, 704). In this steering column described therein an energy absorber is provided having a yoke, which can pivot about a transverse center line of a vehicle body, and an energy absorption member between the yoke and the column jacket, which responds to a linear movement of the column jacket relative to the yoke. The column jacket extends through a drilled hole in the yoke, and a plastics bushing in the drilled hole prevents the column jacket canting relative to the yoke before and during a linear movement of the column jacket. The energy absorption member comprises a flat metallic strip that is attached to one end of the column jacket and is bent over a convex anvil on the yoke. The metallic strip is drawn over the anvil parallel to a longitudinal median line of the column jacket and is plastically deformed in order to convert into work a fraction of the kinetic energy acting on the steering column in the event of an impact.

This energy-absorbing steering column has, like the others described above, proved not very advantageous because of its very elaborate structural design.

On the above basis, it is an object of the present invention to provide a steering column for a motor vehicle by means of which, with only a slight additional construction effort, good energy absorption can be ensured in the event of an accident, in particular a second collision.

This object is achieved by a steering column for a motor vehicle having a steering shaft rotatably mounted in a tubular jacket, wherein the tubular jacket is secured in use at a vehicle bodywork end on two rails extending substantially in an axial direction, the tubular jacket being guided between the rails in the event of an axial displacement, wherein at least one rail is provided with at least one deformation element plastically deformable and secured at least at one end on the respective at least one rail, with absorption of energy, in the event of an axial displacement of the tubular jacket in case of a crash in a manner such that the respective at least one deformation element is deformed by rolling friction via deflector structure fixedly disposed on the tubular jacket.

As a result of the design, according to the invention, of the steering column comprising a steering shaft and a tubular jacket, which is secured on two rails fixed to the bodywork and can be guided between these rails in the event of an axial displacement, at least one rail being assigned a deformation element which is plastically deformable with energy absorption in the event of an axial displacement of the tubular jacket in case of a crash, it is first possible for the structural space for the steering column to be very small, and in particular very shallow, and in addition for sufficient energy absorption by rolling friction to be ensured in the event of an axial displacement. The tubular jacket being guided, in case of a crash, by the rails extending substantially in the axial direction, the tubular jacket being moved forward in a guided manner and not arbitrarily moved into the engine compartment and deformed.

In order not only to provide for energy to be absorbed by the deforming of the deformation element but also to achieve a movement in the forward direction of travel by the releasing of the tubular jacket from the rails, the tubular jacket in certain preferred embodiments is secured on the rails via plastic shearing pins which can be released above a certain axial force and hence also absorb energy.

As a result of the fact that such rails are frequently also provided with slots, which likewise extend in the axial direction, and customarily serve for the longitudinal adjustment of the steering column, a telescopic steering column having deformation elements can be provided without any additional structural space requirement.

According to one embodiment, the deformation element is formed as a sheet metal strip. This sheet metal strip is guided around deflection means, such as, for example, bolts and/or housing edges. The radii or the reciprocal distances apart for the deflection means may be variable and may be selectively set. As a result, the degree of reshaping of the sheet metal strip can be varied and the level of the energy to be absorbed thus set. This entails the advantage that widely differing requirements, such as for example different country-specific requirements, can be met with one and the same apparatus. It is also contemplated by certain embodiments of the invention to make the adjustment dependent on the specific crash conditions and to perform the setting only shortly before an impact.

Other objects, advantages and novel features of the present invention will become apparent from the following detailed description of the invention when considered in conjunction with the accompanying drawings.

BRIEF DESCRIPTION OF THE DRAWINGS

FIG. 5b is a front view of the deformation element of FIG. 5a;

FIG. 5c is an edge view of the deformation element of FIG. 5a;

DETAILED DESCRIPTION OF THE DRAWINGS

Figure 1:
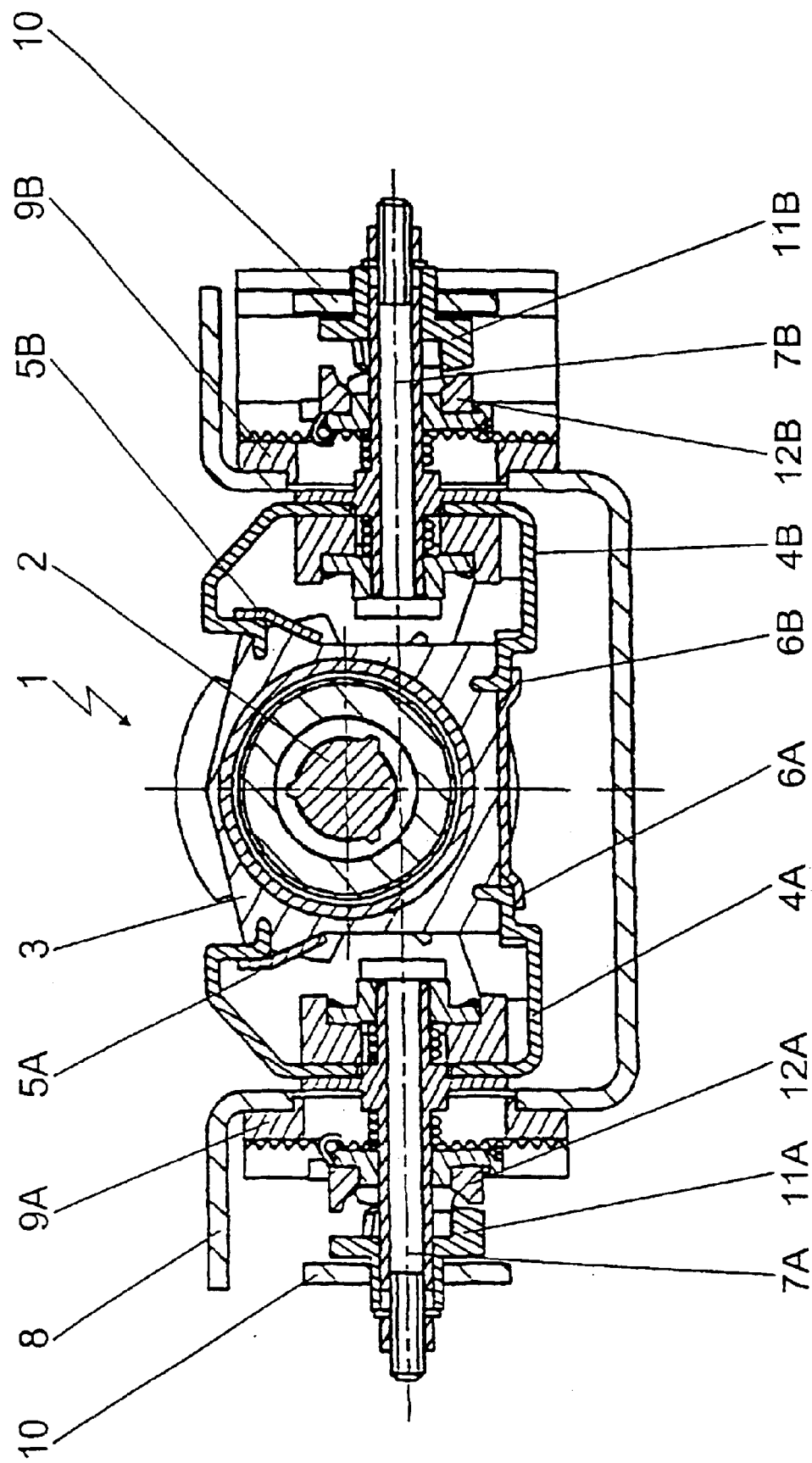
FIG. 1 shows a cross section through a steering column constructed in accordance with a first preferred embodiment of the invention.

FIG. 1 shows a steering column 1, for a motor vehicle in a view in transverse section. The steering column 1 is so constructed here that a steering shaft 2 is rotatably mounted in a tubular jacket 3 and the tubular jacket 3 is secured on two rails 4A, 4B extending substantially in the axial direction, between which the tubular jacket 3 can be guided in the event of an axial displacement in case of a crash.

The tubular jacket 3 is secured on the rails 4A, 4B via plastic shearing pins 5A, 5B, 6A, 6B. The preferred embodiment of the steering column I shown in FIG. 1 is a telescopic steering column 1, at longitudinal displacement being obtained in that substantially axially extending slots are provided in the rails 4A, 4B, in which slots the tubular jacket 3 is guided in the event of a longitudinal displacement.

For a longitudinal displacement of the steering column 1, a clamping bolt 7A, 7B is guided through each of the slots in the rails 4A, 4B and extends substantially in a radial direction away from the tubular jacket 3. The clamping bolts 7A, 7B further pass through a holder 8, which serves to secure the assembly on the bodywork of the vehicle.

Respective rails 9A, 9B for vertical displacement are articulated on the holder 8. The securing and releasing of the longitudinal and vertical adjustments takes place here by a lever 10, though in the cross-sectional view according to FIG. 1 this lever 10 is shown only at the points of its articulation on the two clamping bolts 7A, 7B. This lever 10 is disposed in each case on a cam disc 11A, 11B, which in turn are each connected to a further cam disc 12A and 12B respectively. If the lever 10 is now actuated, the cam discs 11A, 12A and 11B, 12B respectively are adjusted relative to one another in a manner such that either a play is released, and a longitudinal displacement of the steering column 1 along the rails 4A and 4B thus becomes possible, or a vertical displacement via the rails 9A, 9B is possible, or the cam discs 11A, 12A and 11B, 12B respectively are fixed or clamped relative to one another.

"Cam disc" is here understood as meaning, in each case, a disc having a profile which allows play between adjacent structural elements in a first position of the disc and produces a clamping effect, for example as a result of a raised portion, in a second position.

Figure 2:
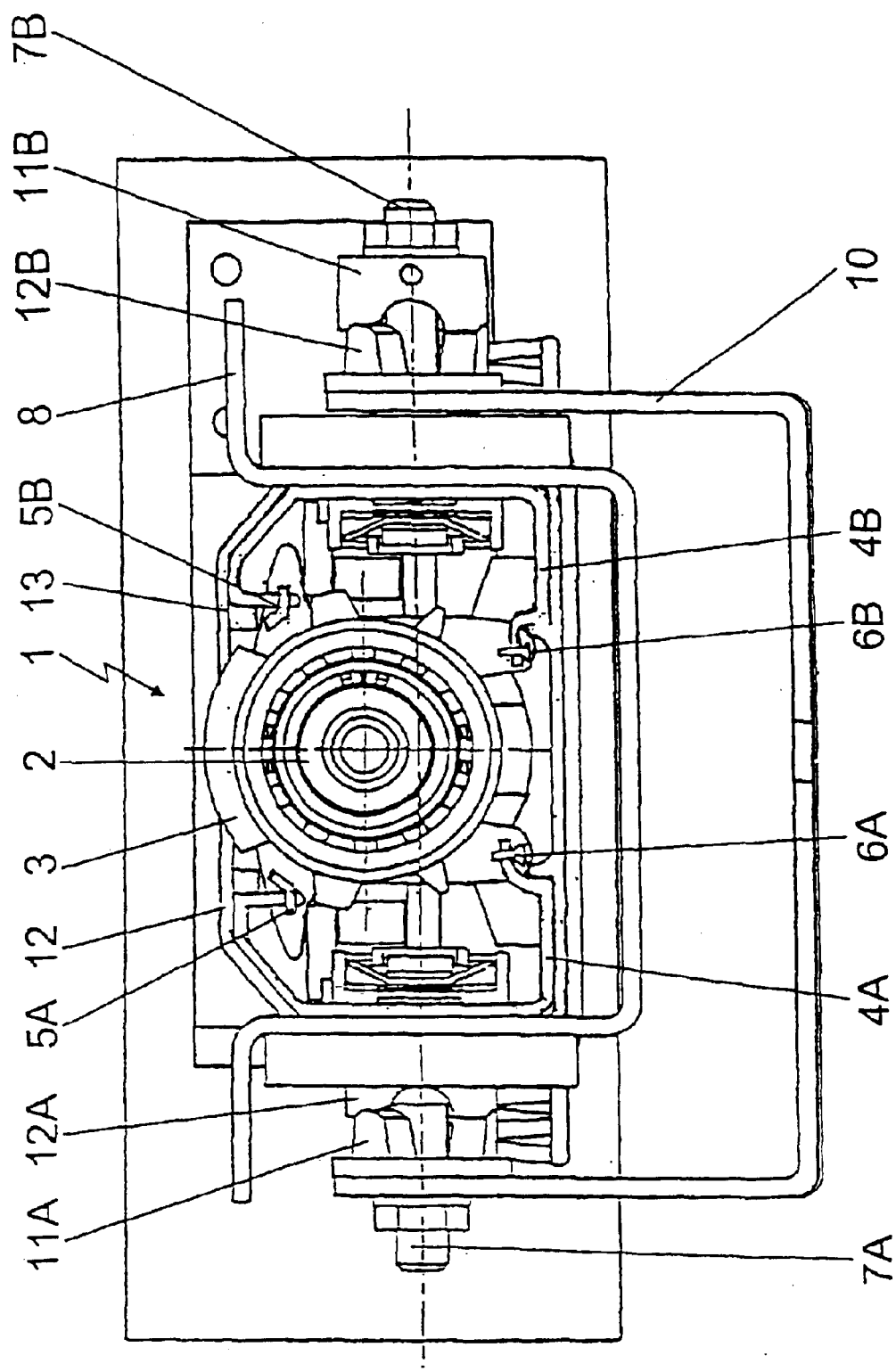
FIG. 2 shows a cross section through a steering column constructed in accordance with a second preferred embodiment of the invention.

FIG. 2 shows a further embodiment of the invention, in which, again in accordance with FIG. 1, a cross section through the steering column 1 is shown. However, in this case the section is taken further forward in the direction of forward travel than in the case of FIG. 1, which is why the vertical and longitudinal adjustment mechanism in accordance with FIG. 1 is no longer shown in a sectional view and the lever 10 is therefore more clearly identifiable. Otherwise, parts corresponding to FIG. 1 have been designated in FIG. 2 by the same reference numbers.

In order to permit forward movement of the tubular jacket 3 in the event of an accident, the tubular jacket 3 is received by two rails 4A, 4B between which it can slide forward in a guided manner in case of a crash. In normal operation, the tubular jacket 3 is fixed in the rails 4A, 4B via two plastic shearing pins 5A, 5B, 6A, 6B in each case. In accordance with the preferred embodiment shown in FIG. 2, the plastic shearing pins 5A, 5B and 6A, 6B, respectively, have been injection moulded directly onto the tubular jacket 3 during the assembly of the rails 4A, 4B through holes drilled in the tubular jacket 3 and the rails 4A, 4B. As a result of the diameter of the holes and of the various modifications to the plastic, the shearing force of the plastic bolts in a crash and hence also the energy absorption can be controlled. A possible threshold at which the plastics shearing pins 5A, 5B, 6A, 6B are released from the tubular jacket 3 and/or the rails 4A, 4B may be, for example, approximately 7 kg/N.

Such a design has proven advantageous, inter alia, because the injection-moulded plastic for fixing the tubular jacket 3 on the rails 4A, 4B can additionally be used to compensate for production tolerances in the tubular jacket 3 and the rails 4A, 4B that also serve to provide guidance in case of a crash.

The clamping bolts 7A, 7B of the clamping region engage through the slots in the rails 4A, 4B, as a result of which rear guidance of the clamping bolts 7A, 7B is guaranteed. In their front region, facing the vehicle occupants, the rails 4A, 4B are guided in a box section 13, which is connected to the front holder 8.

It has been found that the distance between the rails 4A, 4B should he selected such that a securing mechanism of an indicator switch module finds space between them, together with the tubular jacket 3, in a crash sequence. With this type of configuration, it is only the main plane of the indicator switch module that limits the forward travel, when it encounters the ends of the rails 4A, 4B. The forward travel is constant here, irrespective of the set position of the tubular jacket 3.

In general, tests have shown that it is particularly advantageous if a forward travel of approximately 100 mm is available in case of a crash.

Figure 3:
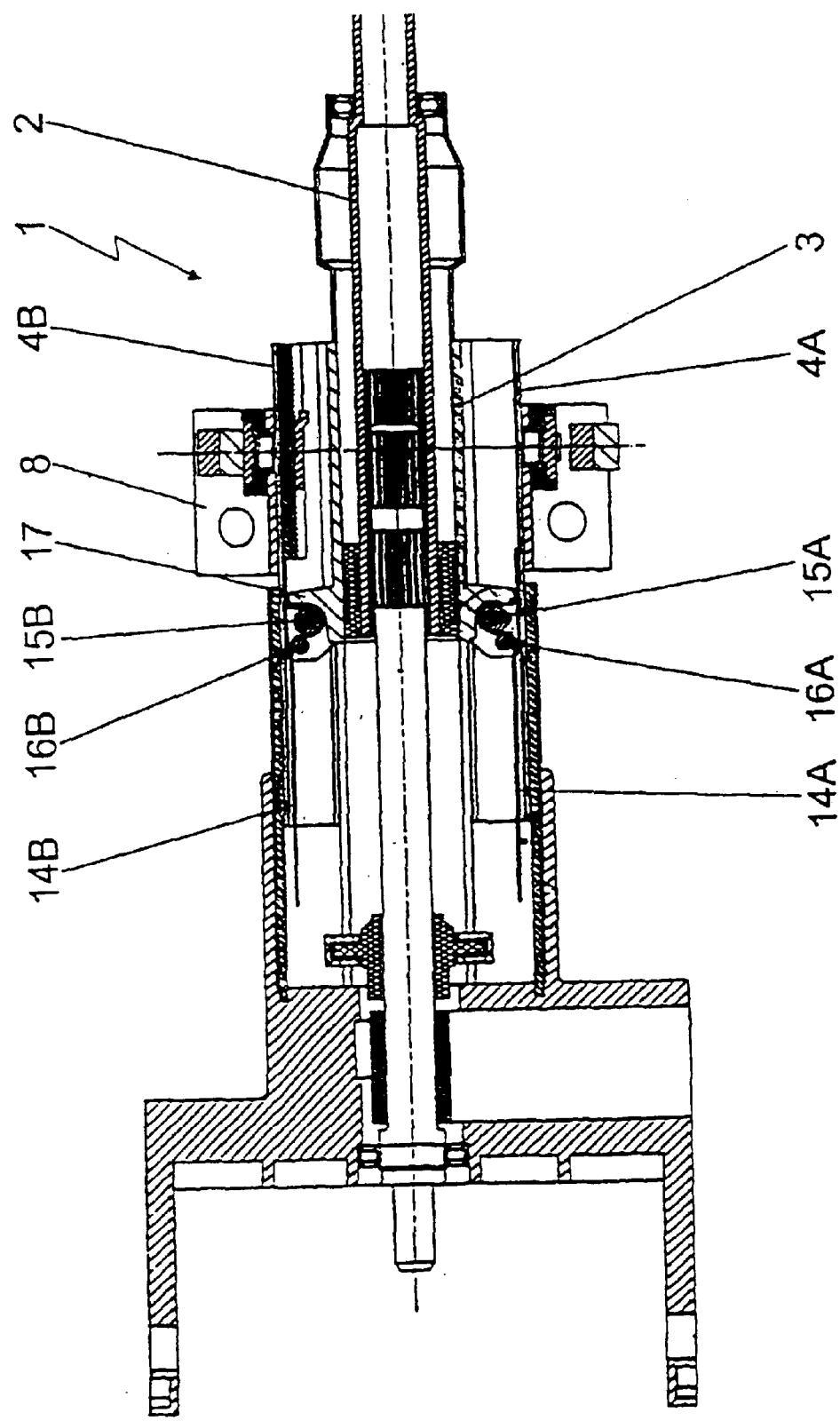
FIG. 3 is a longitudinal section device through a steering column constructed according to preferred embodiments of the invention shown in a pre-accident state.

FIG. 3 shows a section through a steering column 1 in a steering direction. The steering shaft 2, which is guided in the tubular jacket 3, is again identifiable.

Each of the rails 4A, 4B secured on the tubular jacket 3 is assigned a deformation element 14A, 14B, which in the event of an axial displacement of the tubular jacket 3 in case of a crash, in other words as soon as the tubular jacket 3 is moved in the rails 4A, 4B, is plastically deformed with absorption of energy. The deformation element 14A, 14B, which in this case is in the form of a sheet metal strip, is secured on each of the rails 4A, 4B and lies on deflection means fixedly connected to the tubular jacket 3, the deflection means in this case each being formed by two bolts 15A, 16A and 15B, 16B respectively and a housing edge 17 of the tubular jacket 3.

If the tubular jacket 3, after release of the fixing mechanism from the rails 4A, 4B in case of a crash, is now moved relative to the rails 4A, 4B, the sheet metal strips 14A, 14B are guided past the bolts 15A, 15B, 16A, 16B and the edge 17 with constant flexion and reflexion, energy being absorbed by this rolling flexion.

Figure 4:
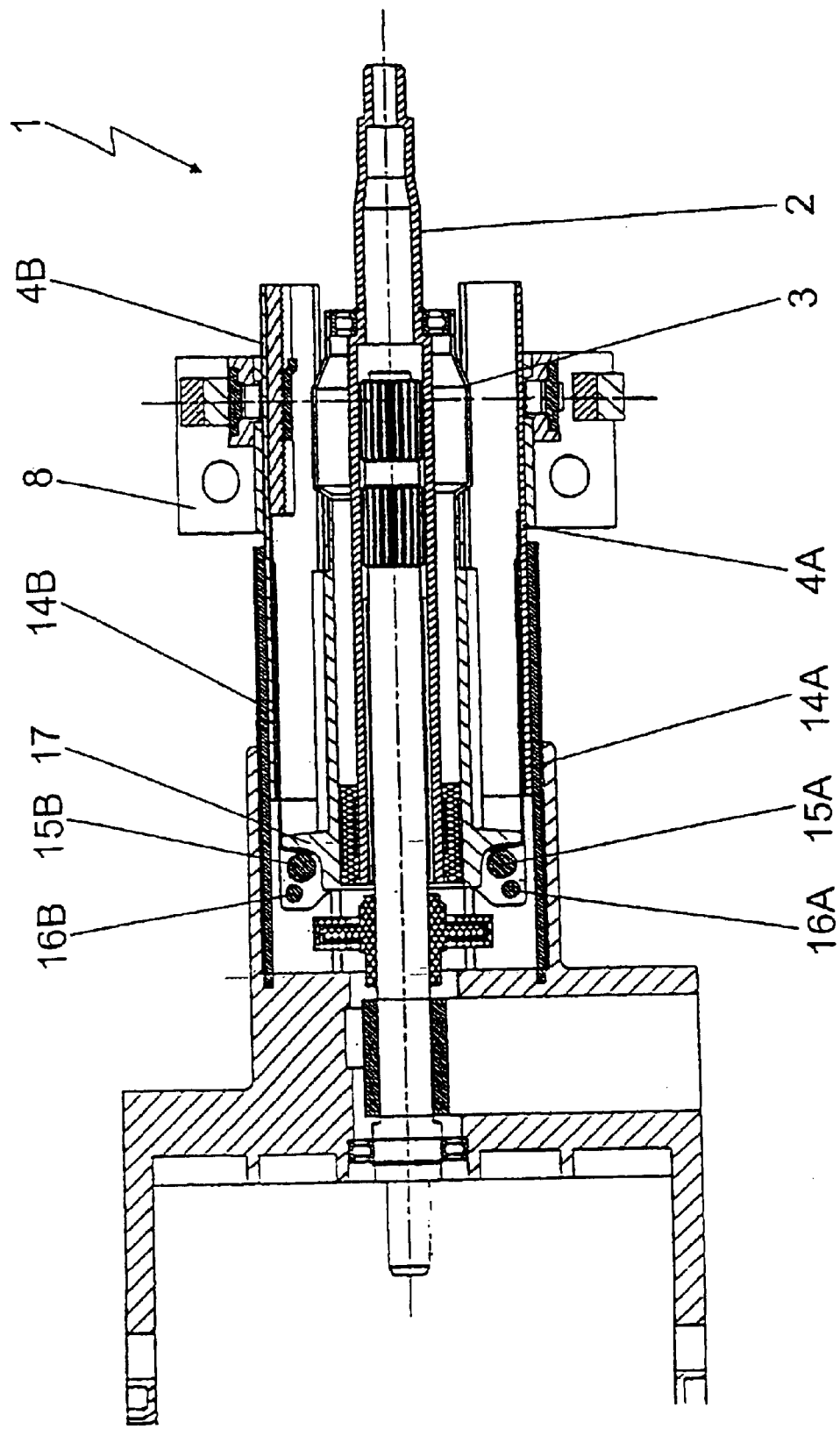
FIG. 4 is a longitudinal sectional view through the steering column shown in FIG. 3 shown in a post-accident state.

FIG. 4 shows an illustration corresponding to FIG. 3, FIG. 3 and FIG. 4 differing in that FIG. 3 shows a position of the steering column 1 in a normal state, whereas FIG. 4 shows a state following accident-induced deformation. If FIG. 4 is observed, it can be seen that the sheet metal strips 14A, 14B have wound completely through the bolts 15A, 16A and 15B, 16B respectively and over the housing edge of the tubular jacket 3, and, as it were, unrolled.

Figure 5A:
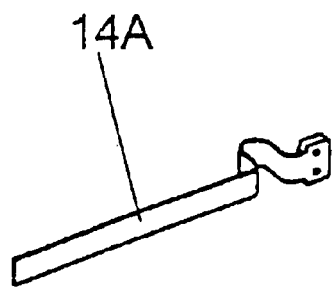
FIG. 5a is a perspective view of a deformation element constructed in accordance with a preferred embodiment of the inventions.
Figure 5B:
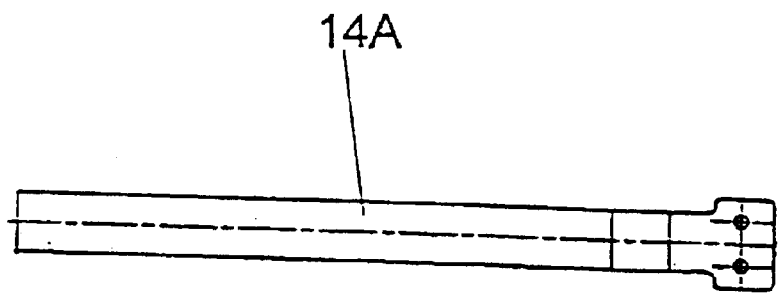
Figure 5C:
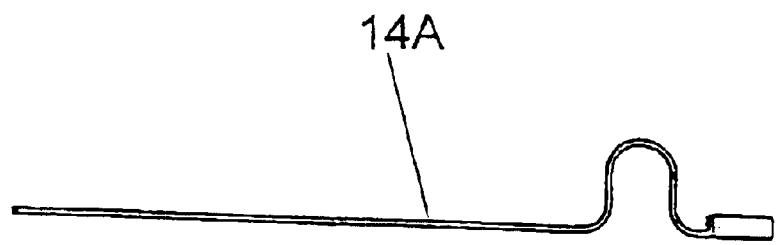

FIGS. 5a to 5c shows the sheet metal strip 14A itself in a three-dimensional respective view (FIG. 5a), a plan view (FIG. 5b) and a lateral view (FIG. 5c). FIGS. 5a to 5c show the sheet metal strip 14A in its still undeformed, normal state, built into the steering column 1. This sheet metal strip 14A is identical to the sheet metal strip 14B.

According to this embodiment, the sheet metal strip 14A has a uniform thickness over its entire length. However, embodiments are also contemplated with the sheet metal strip 14A formed with variable thickness over its length. In addition, even particular force patterns can be shown it the strip width of the sheet metal strips 14A and 14B, respectively, is varied over their length according to certain contemplated embodiments.

Furthermore, the desired level of energy to be absorbed by the sheet metal strips 14A, 14B can be set by varying the radii of the bolts 15A, 16A and 15B, 16B respectively, the distances apart of the bolts 15A, 16A and 15B, 16B respectively, and the distance from the housing edge 17 of the tubular jacket 3, which edge can also serve as a deflection means. Moreover, the sheet metal thickness and the strip width of the sheet metal strips 14A, 14B can be varied and thus adjusted to the respective requirements.

Figure 6A:
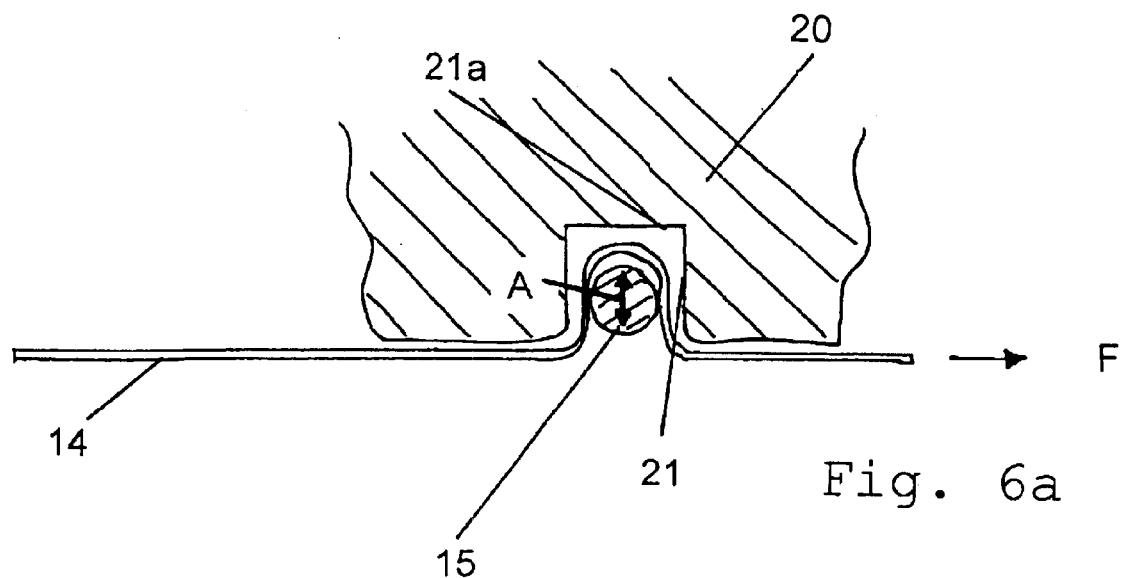
FIG. 6a shows a deformation element with a first embodiment of deflection means.
Figure 6B:
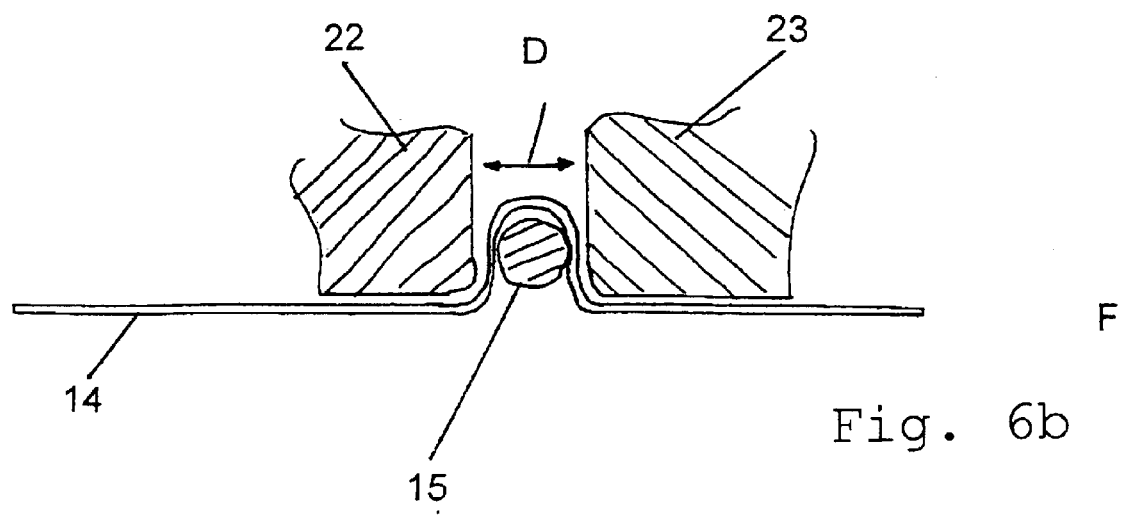
FIG. 6b shows a deformation element with a second embodiment of deflection means.

FIGS. 6a and 6b show various examples of embodiment of deflection means having a sheet metal strip 14, by means of which the variation of the respective distances apart of the deflection means and hence a variation of the desired energy absorption level can be obtained.

According to FIG. 6a, the deflection means comprised a jaw 20, in which a groove 21 is made. Mounted in the groove 21 is a bolt 15. The sheet metal strip 14 is guided around the bolt, so that it comes to lie between the bolt 15 and the walls of the groove 21. The bolt 15 is so mounted that it can be displaced in the groove in the direction of the double arrow A. When this occurs, the distance between the bolt 15 and the upper wall 21A of the groove changes. As a result of the variation in distance, the degree of reshaping of the sheet metal strip 14 and hence also the force F corresponding to the crash force can be steplessly changed.

The displacement of the bolt can be obtained, for example, by a spindle system with a servomotor or solenoid.

In the embodiment shown in FIG. 6b, the bolt 15 is disposed between two jaws 22, 23. The distance D between the jaws 22, 23 being variable. in accordance with the alternative embodiment described earlier, the degree of reshaping of the sheet metal strip can be determined via this change of distance. The adjusting mechanism of the jaws 22, 23 can also be implemented via a spindle system with a servomotor or solenoid.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Steering column for a motor vehicle having a steering shaft rotatably mounted in a tubular jacket,
wherein the tubular jacket is secured in use at a vehicle bodywork end of the tubular jacket on two rails extending substantially in an axial direction of the tubular jacket, the tubular jacket being guided between the rails in the event of an axial displacement of the tubular jacket, wherein at least one rail is provided with at least one deformation element plastically deformable and secured at least at one end on the respective at least one rail, with absorption of energy, in the event of an axial displacement of the tubular jacket in case of a crash in a manner such that the respective at least one deformation element is deformed by rolling friction via deflector structure fixedly disposed on the tubular jacket, and wherein at least one of radii and spacing between the deflector structure are variable and selectively settable.

2. Steering column according to claim 1, wherein the tubular jacket is fixed on the rails via plastic shearing pins.

3. Steering column according to claim 2, wherein the plastic shearing pins are injection molded through holes drilled in the rails and the tubular jacket.

4. Steering column according to claim 3, wherein the plastic shearing pins are releasable from one of the tubular jacket and the rails under a predetermined force.

5. Steering column according to one of claim 3, wherein the rails are formed with slots extending substantially axially for accommodating longitudinal adjustment of the tubular jacket.

6. Steering column according to claim 3, wherein the at least one deformation element includes a sheet metal strip.

7. Steering column according to claim 3, wherein the deflector structure includes bolts and housing edges on the tubular jacket.

8. Steering column according to claim 2, wherein the plastic shearing pins are releasable from one of the tubular jacket and the rails under a predetermined force.

9. Steering column according to one of claim 8, wherein the rails are formed with slots extending substantially axially for accommodating longitudinal adjustment of the tubular jacket.

10. Steering column according to claim 8, wherein the at least one deformation element includes a sheet metal strip.

11. Steering column according to claim 8, wherein the deflector structure includes bolts and housing edges on the tubular jacket.

12. Steering column according to one of claim 2, wherein the rails are formed with slots extending substantially axially for accommodating longitudinal adjustment of the tubular jacket.

13. Steering column according to claim 2, wherein the at least one deformation element includes a sheet metal strip.

14. Steering column according to claim 2, wherein the deflector structure includes bolts and housing edges on the tubular jacket.

15. Steering column according to one of claim 1, wherein the rails are formed with slots extending substantially axially for accommodating longitudinal adjustment of the tubular jacket.

16. Steering column according to claim 15, wherein the at least one deformation element includes a sheet metal strip.

17. Steering column according to claim 15, wherein the deflector structure includes bolts and housing edges on the tubular jacket.

18. Steering column according to claim 1, wherein the at least one deformation element includes a sheet metal strip.

19. Steering column according to claim 18, wherein the deflector structure includes bolts and housing edges on the tubular jacket.

20. Steering column according to claim 1, wherein the deflector structure includes bolts and housing edges on the tubular jacket.

21. Steering column according to claim 1, wherein the radii and spacing between the deflector structure are set as a function of respective crash conditions.

22. Steering column according to one of claim 1, wherein guiding of the tubular jacket between the rails provides a forward travel of at least approximately 100 mm in the event of an accident.

23. Steering column according to claim 1 wherein energy absorbable by the deformation element can be set by varying the material, material thickness or width of the deformation element, the radii of the deflection means and/or the distance between the deflector structure.

24. Steering column for a motor vehicle comprising:

a tubular jacket, a steering shaft rotatably mounted in the tubular jacket, first and second rails extending in an axial direction and secured in use to a vehicle body, said rails guidably supporting a vehicle bodywork end of the tubular jacket for axial movement along an axis of the tubular jacket between the rails, a plastically deformable deformation element connected to the first rail and the tubular jacket and operable to absorb collision forces resulting during relative axial movement of the tubular jacket and the first rail, and deflection structure fixed to the tubular jacket and operable to deflect the deformation element with rolling friction during said relative axial movement of the tubular jacket and first rail in response to said collision forces, wherein at least one of radii and spacing between the deflector structure are variable and selectively settable.

25. Steering column according to claim 24, comprising shear pins fixing the tubular jacket on the rails, said shear pins being operable to release their connection of the tubular jacket and rails in response to predetermined collision forces on the tubular jacket.

26. Steering column according to claim 25, wherein the plastic shearing pins are releasable from one of the tubular jacket and the rails under a predetermined force.

27. Steering column according to claim 24, wherein the deformation element is a sheet metal strip.

28. Steering column according to claim 24, wherein the deflection structure includes a bolt on the tubular jacket.

29. Steering column according to claim 28, wherein the deflection structure includes a housing edge on the tubular jacket.

30. Steering column according to claim 29, comprising means for varying the position of the bolt and housing edge.

31. Steering column according to claim 24, wherein a second plastically deformable deformation element is connected to the second rail and the tubular jacket and operable to absorb collision forces resulted in relative axial movement of the tubular jacket and the second rail, and wherein second deflection structure is fixed to the tubular jacket and operable to deflect the second deformation element with rolling friction during said relative axial movement of the tubular jacket and second rail in response to said collision force.

32. Steering column according to claim 31, wherein said first and second deformation element are disposed at respective opposite sides of the tubular jacket.

33. Steering column according to claim 32, wherein said deflection structure include respective bolts carried by the tubular jacket which in use are partially wrapped by the respective deformation elements.

34. Steering column according to claim 33, wherein said deflection structure includes respective housing edges on said tubular jacket.

* * * * *